United States Patent [19]

Hunter et al.

[11] Patent Number: 4,525,509
[45] Date of Patent: Jun. 25, 1985

[54] METHOD FOR PRODUCING FREE-FLOWING, WATER-SOLUBLE POLYMER GELS

[75] Inventors: Wood E. Hunter, Pittsburgh, Pa.; Gary P. Craun, Wickliffe, Ohio

[73] Assignee: Calgon Corporation, Pittsburgh, Pa.

[21] Appl. No.: 562,303

[22] Filed: Dec. 16, 1983

[51] Int. Cl.$^3$ .......................... C08J 3/12; C08K 5/52; C08L 39/00
[52] U.S. Cl. .................................. 524/141; 524/145; 524/916; 524/922; 524/555
[58] Field of Search ............... 524/916, 922, 141, 145, 524/555

[56] References Cited

U.S. PATENT DOCUMENTS

| | | | |
|---|---|---|---|
| 3,367,918 | 2/1968 | Lesinski | 524/922 |
| 3,806,485 | 4/1974 | Frisque | 524/916 |
| 3,839,500 | 10/1974 | Dexter | 524/922 |
| 3,941,739 | 3/1976 | Newman | 524/388 |
| 3,960,584 | 6/1976 | Savage | 524/922 |
| 4,113,688 | 9/1978 | Pearson | 260/29.6 PM |
| 4,134,871 | 1/1979 | Otani et al. | 260/29.6 H |
| 4,247,437 | 1/1981 | Ohshima | 524/916 |
| 4,339,373 | 7/1982 | Robison | 524/521 |
| 4,358,550 | 11/1982 | Jacono et al. | 523/348 |

FOREIGN PATENT DOCUMENTS

| | | |
|---|---|---|
| 2049253 | 4/1977 | Japan . |
| 72094180 | 3/1973 | Netherlands . |
| 546623 | 4/1977 | U.S.S.R. . |

*Primary Examiner*—C. Warren Ivy
*Attorney, Agent, or Firm*—Michael C. Sudol; R. Brent Olson; William C. Mitchell

[57] ABSTRACT

The instant invention is directed to a method for preparing free-flowing, water-soluble polymer gels comprising:
(a) reducing the size of water-soluble polymer gels by a size-reduction means, so as to produce polymer gel particles which are less than ½ inch in their longest dimension; and
(b) adding to the size-reduced polymer gels of Step (a) 0.001 to 20 percent, by weight, of an amphipathic compound, thereby reducing the adhesion of said gel particles to themselves and other substances.

The instant invention is also directed to a free-flowing, water-soluble polymer gel admixture comprising:
(a) size-reduced, water-soluble polymer gel particles, wherein said gel particles are less than ½ inch in their longest dimension; and
(b) an amphipathic compound.

10 Claims, No Drawings

METHOD FOR PRODUCING FREE-FLOWING, WATER-SOLUBLE POLYMER GELS

BACKGROUND OF THE INVENTION

This invention relates to a method for preparing free-flowing, water-soluble polymer gels and to the unique products thus obtained. More particularly, this invention relates to a method wherein a small quantity of an amphipathic compound is added to a water-soluble cationic, anionic, non-ionic or amphoteric polymer gel, thereby reducing the adhesiveness of the gel to itself and to other substances. This reduced adhesiveness allows the polymers of the instant invention to be stored in free-flowing form for long periods of time.

Water-soluble polymers can be prepared in several forms. For instance, it is known in the art that water-soluble polymers can be prepared in the dispersed phase of water-in-oil emulsions. These polymers are then generally sold as water-in-oil emulsions which contain 25 to 30 percent by weight polymer solids and an inverting surfactant.

Water-soluble polymers can also be prepared as aqueous solutions. However, since aqueous solution polymerization processes typically produce polymer gels which are viscous and difficult to handle as fluids, these polymers are usually sold as dry powders which contain 85 to 98 percent by weight polymer solids or as dilute aqueous solutions containing less than 20 percent polymer solids.

Disadvantages are inherent in all of the polymer forms mentioned above. For example, inverted water-in-oil emulsions generally are lower in activity than powdered polymers, emulsification may deleteriously affect the performance characteristics of the polymer, and oil and surfactant requirements keep manufacturing costs high. Powdered polymers are costly to produce due to the drying and milling steps required, and these operational steps may also degrade polymer quality. Dilute aqueous solutions of water-soluble polymers, though easy to handle, are costly to transport due to their low active polymer content.

Accordingly, the need exists for a low-cost method of preparing anionic, cationic, non-ionic and amphoteric water-soluble polymer gels which can be easily and economically handled, and which have improved performance characteristics and high polymer concentrations. Such an invention would satisfy a long-felt need and constitute a notable advance in the art.

U.S. Pat. Nos. 4,113,688 and 4,358,550 describe processes for rapidly dissolving water-soluble polymer gels into water to form dilute aqueous solutions in a manner which minimizes degradation of the polymers' physical properties, comprising extruding, cutting and slurrying the polymers in water, followed by subjecting the slurry to high shear forces and the addition of more water. The processes of these references do not, however, produce high solids polymer gels which are easily handled and which can be stored for extended periods of time in free-flowing form. Moreover, these processes require either the use of expensive make-down equipment at the use site or transportation of dilute polymer solutions.

U.S. Pat. No. 4,134,871 discloses a method for reducing the adhesiveness of acrylamide-type polymers comprising adding polyethylene glycol to these polymers during manufacture, thereby allowing mincing and drying with minimum adhesion. Like references U.S. Pat. Nos. 4,113,688 and 4,358,550, reference U.S. Pat. No. 4,134,871 does not disclose a method for production of high solids polymer gels which can be easily handled and stored for long periods of time without agglomeration.

One aspect of this invention relates to a method for preparing free-flowing, water-soluble polymer gels. This method, aside from minimizing agglomeration of polymer gel particles, obviates the drying and milling steps required in other manufacturing processes, thereby lowering production costs while minimizing product degradation due to processing. The unique products made by the inventors' process are free-flowing, high molecular weight, cationic, anionic, non-ionic and amphoteric water-soluble polymer gels. These gels remain free-flowing and readily soluble after storage for extended periods of time. Also, these gels remain free-flowing after multiple freeze-thaw cycles and after storage at elevated temperatures.

Another aspect of the invention relates to a free-flowing polymer gel admixture comprising size-reduced polymer gel particles and an amphipathic compound.

DETAILED DESCRIPTION OF THE INVENTION

This invention relates to a method for preparing free-flowing, water-soluble polymer gels comprising:
 (a) reducing the size of high molecular weight, water-soluble polymer gels by a size-reduction means, so as to produce polymer gel particles which are less than ½ inch in their longest dimension; and
 (b) adding to the size-reduced, polymer gels of Step (a) 0.001 to 20 percent, by weight, of an amphipathic compound, thereby reducing the adhesion of said gel particles to themselves and other substances.

Size reduction may be accomplished by any comminution means, including but not limited to grinding, milling, triturating, levigating, rasping, slicing, cutting, extruding and flaking, which will produce polymer gel particles which are less than ½ inch in their longest dimension. Preferably, the size reduction means should produce polymer gel particles which are between 1/32 inch and ⅜ inch in their longest dimension. Most preferably, the size-reduction means should produce polymer gel particles which are uniform, discreet and which have particle diameters between 1/16 inch and 5/32 inch, the particle diameter being the longest dimension of a particular polymer gel particle.

The polymer gels of this invention may be cationic, anionic, non-ionic or amphoteric. Cationic polymer gels which can be used in this process include, but are not limited to, polymers made from dimethyldiallyl ammonium chloride (DMDAAC), diethyldiallylammonium chloride (DEDAAC), methacryloyloxyethyl trimethyl ammonium chloride (METAC), acryloyoloxyethyl trimethyl ammonium chloride, methacryloyloxyethyl trimethyl ammonium methosulfate (METAMS), acryloyloxyethyl trimethyl ammonium methosulfate, and methacrylamido propyl trimethyl ammonium chloride (MAPTAC), alone or in combination, and polymers made by polymerizing the above-listed cationic monomers with acrylamide, methacrylamide or N,N-dimethylacrylamide. Anionic polymer gels which can be used in this process include, but are not limited to, polymers made from acrylic acid, methacrylic acid, vinyl sulfonic acid, styrene sulfonate β-carboxy ethylacrylate and acrylamido methyl propane sulfonic acid, alone or in combination, and salts of these polymers, and polymers made by polymerizing the above-listed anionic monomers with acrylamide, methacrylamide, N,N-dimethylacrylamide and vinyl acetate and acrylonitrile, alone or in combination, and salts of these monomers. Non-ionic polymer gels which can be used in this process include, but are not limited to, polymers made from acrylamide, methacrylamide and N,N-dimethylacrylamide, alone or in combination, which are hydrolyzed less than 1 percent by weight. Amphoteric polymer gels which can be used in this process include, but are not limited to, polymers made by polymerizing the above-listed anionic monomers with the above-listed cationic monomers and especially polymers made from acrylic acid and methacryloyloxyethyl trimethyl ammonium chloride and polymers made from dimethyldiallylammonium chloride and acrylic acid.

The process disclosed herein is especially well suited for use with polymer gels which are produced from acrylic acid and acrylamide, or gels produced by hydrolyzing polyacrylamide. Also, the process is especially well suited for preparing free-flowing gels from polymers produced from acrylamide and METAMS, acrylamide and DMDAAC, and acrylamide and METAC.

Preferably, the cationic, anionic, non-ionic and amphoteric polymer gels which are suitable for this invention include those with molecular weights greater than 100,000, as determined by light scattering techniques, and those which contain 20 to 90 percent by weight polymer solids. Most preferably, the polymers used in the process disclosed by the inventor contain 40 to 70 percent by weight polymer solids.

The inventors have discovered that amphipathic compounds, when added to comminuted, high molecular weight, water-soluble anionic, cationic, non-ionic or amphoteric polymer gels, reduce adhesion between the gel particles themselves and other materials. As used herein, the term "amphipathic compound" refers to a compound which is surface-active or which has both hydrophobic and hydrophilic properties.

Generally, any anionic, cationic, non-ionic or amphoteric polymer gel may be treated with any amphipathic compound to reduce the adhesiveness of the gel. However, when the polymer gel treated in accordance with the process disclosed herein is cationic, anionic amphipathic compounds are preferred for preparation of free-flowing gels. When the polymer gel treated in accordance with the process described herein is anionic, cationic amphipathic compounds are preferred. When the gel to be treated is non-ionic, non-ionic or cationic amphipathic compounds are preferred to produce free-flowing, non-ionic polymer gels.

The cationic amphipathic compounds which are preferred as agents to reduce gel adhesiveness between anionic gel particles include quaternary ammonium compounds, quaternary imidazoline compounds, hydrogenated tallow quaternary ammonium compounds, imidazolines, fatty amine oxides, fatty amines and amine ethoxylates. The more preferred cationic amphipathic compounds are ditallow imidazolium quaternary compounds.

The anionic amphipathic compounds which are preferred as agents to reduce gel adhesion between cationic gel particles include phosphate esters, sulfonates, sulfosuccinates, alkyl phenyl phosphates and sulfated alkyl phenyl ethoxylates. The most preferred anionic amphipathic compound is a complex phosphate ester of alkyl alcohol ethoxylate.

The non-ionic amphipathic compounds preferred for use with the disclosed invention include polyoxyethylene sorbitan fatty acid esters; ethylene oxide/propylene oxide block copolymers, commonly sold under the BASF Wyandote tradename Pluronic, polyethylene oxide, polyethylene maleic anhydride and polypropylene oxides.

For polymer gels of acrylamide and METAMS, the preferred amphipathic compound is a complex phosphate ester of alkyl alcohol ethoxylate, containing a mixture of monoester and diester, commonly sold under the GAF tradename Gafac RS-410 which may be represented by the following structure:

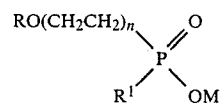

wherein
$R^1 = RO(CH_2CH_2)_n$ or OM;
R = alkyl or alkylaryl radical;
n = average number of moles ethylene oxide reacted with one mole hydrophobe; and
M = hydrogen or alkali metal, and which typically at 25° C. is a hazy viscous liquid having specific gravity of 8.6 and an acid number of 95 to 115. For acrylic acid/acrylamide copolymers, made either by copolymerizing acrylic acid and acrylamide or by hydrolyzing polyacrylamide, the preferred amphipathic compound is a ditallow imidazolium quatenary compound, commonly sold under the Alkaril tradename of Alkaquat T.

The amphipathic compounds of this invention can be added to comminuted gel solids by any means which will ensure good mixing of the gel and the amphipathic compound. For example, tumble mixers or various types of commercial blenders are suitable for this task. The amphipathic compound should be added so as to produce coated gel particles which contain 0.001 percent to 20 percent of the amphipathic compound, by weight. Preferably, the amphipathic compound should be added so as to produce coated gel particles which contain 0.5 to 5.0 percent by weight of the amphipathic compound. It is also preferable to add the amphipathic compounds to freshly-comminuted polymer gels, so as to minimize the possibility of agglomeration prior to addition of the amphipathic compound.

Other processing steps may be performed in conjunction with the method disclosed herein without departing from the spirit of the invention. For example, post-treatment polymerization steps, such as residual monomer reduction and/or hydrolysis, may be performed as required.

EXAMPLES

The following examples illustrate the present invention in greater detail. It should be understood that the invention is not in any way limited by these examples.

EXAMPLES 1 THROUGH 15

Flowability After One Day:

Examples 1 through 15 show the effect of various amphipathic compounds on the flowability of acrylamide/METAMS, acrylamide/DMDAAC, hydrolyzed polyacrylamide, and polyacrylamide polymer gels. In Table I, the percent solids of each polymer gel is shown, as is the percent, by weight, of the amphipathic compound added to each gel. The column labeled "Results" shows visual observations made by the experimenters after one day. In all cases, the polymer gels were comminuted by grinding immediately prior to addition of the amphipathic compound. Grinding was carried out by cutting the polymer gel into strips and feeding it into a commercial meat grinder. Dye plate opening sizes for the grinder used ranged from 1/16 inch to 5/32 inch. After grinding, the resulting gel particles were tumbled in a mixer and the designated amphipathic compound was added. Each treated gel sample weighed 100 grams and was stored in a polyethylene bag under a 9-pound weight for one day. Storage under a weight tended to increase compaction. Three classifications were used to characterize the treated polymer gels: free-flowing, sticky and rubbery. Free-flowing means that no adhesion was apparent; sticky means that moderate adhesion was present; and rubbery means that substantial adhesion was present.

pounds were added. The percentage by weight of the amphipathic compound added, the type of compound added, the length of the experiment, in months, and the adhesion results are shown for Examples 16 through 20 in Table II. The gels were prepared similarly to those of Examples 1 through 15. They were then packaged in polyethylene bags, which are placed in fiber drums for storage. The net weight of each drum was 50 pounds.

TABLE II

| Example No. | Polymer Gel | Amphathic Compound (Percent By weight of Gel) | Time (Months) | Adhesion Result |
|---|---|---|---|---|
| 16 | 85/15 Acrylamide/METAMS[1] | Gafac RS-410 (.5) | 6 | Free-Flowing |
| 17 | 70/30 Acrylamide/METAMS | Gafac RS-410 (.5) | 2 | Free-Flowing |
| 18 | 70/30 Acrylamide/DMDAAC[2] | Gafac RS-410 (2.0) | 1 | Free-Flowing |
| 19 | 30% Hydrolyzed Polyacrylamide | Alkaquat T (4.0) | 1 | Free-Flowing |
| 20 | Polyacrylamide | Alkaquat T (4.0) | 1 | Free-Flowing |

[1]METAMS = methacryloyloxyethyl trimethyl ammonium methosulfate
[2]DMDAAC = dimethyldiallyl ammonium chloride

EXAMPLES 21 THROUGH 24

Dilution Tests After Storage:

Examples 21 through 24 show the results of dilution tests after storage. These tests measured viscosity as an indicator of solubility. Thus, when the viscosity measurement for a sample leveled, the polymer was solubilized. The dilution tests were conducted on gel samples which had been stored for 1 to 2 months.

The dilution tests were conducted by adding 2000 grams of deionized water to a one-gallon container. The container was equipped with a pitched-blade (6 blades), 3-inch diameter agitator. The agitator blades were located 1.5 inches from the bottom of the container, and

TABLE 1

| Example No. | Polymer Gel | Percent Solids (By weight of Gel) | Amphipathic Compound | Percent | Adhesion Result (One Day) |
|---|---|---|---|---|---|
| 1 | 70/30 Acrylamide/METAMS[1] | 50 | PEG 6000[3] | 0.5 | Free-Flowing |
| 2 | 70/30 Acrylamide/METAMS | 50 | Tween 40[4] | 0.5 | Sticky[7] |
| 3 | 70/30 Acrylamide/METAMS | 50 | Gafac RS410 | 0.5 | Free-Flowing |
| 4 | 85/15 Acrylamide/METAMS | 47.5 | Gafac RS410 | 0.5 | Free-Flowing |
| 5 | 70/30 Acrylamide/DMDAAC[2] | 42.5 | Gafac RS410 | 2.0 | Free-Flowing |
| 6 | 70/30 Acrylamide/DMDAAC | 42.5 | Aklaquat T | 2.0 | Free-Flowing |
| 7 | 30% Hydrolyzed Polyacrylamide | 45 | Pluronic F127[5] | 2.0 | Free-Flowing |
| 8 | 30% Hydrolyzed Polyacrylamide | 45 | Alkaquat T | 1.0 | Free-Flowing |
| 9 | 30% Hydrolyzed Polyacrylamide | 45 | Alkaquat T | 2.0 | Free-Flowing |
| 10 | 30% Hydrolyzed Polyacrylamide | 45 | Hodag C-1000[6] | 2.0 | Free-Flowing |
| 11 | Polyacrylamide | 43 | Pluronic P104 | 0.5 | Free-Flowing |
| 12 | Polyacrylamide | 43 | RS-410 | 2.0 | Rubbery[8] |
| 13 | Polyacrylamide | 43 | Pluronic F127 | 2.0 | Free-Flowing |
| 14 | Polyacrylamide | 43 | Hodag C-1000 | 2.0 | Sticky[9] |
| 15 | Polyacrylamide | 43 | Alkaquat T | 2.0 | Free-Flowing |

[1]METAMS = methacryloyloxyethyl trimethyl ammonium methosulfate.
[2]DMDAAC = dimethylidiallyl ammonium chloride.
[3]PEG 6000 = polyethylene glycol; 6000 molecular weight.
[4]Tween 40 = polyoxyethylene 20 sorbitan monopalmitate, having a hydroxyl number of 90 to 105, available from ICI Americas, Inc.
[5]Pluronic F127 = ethylene oxide/propylene oxide block copolymer, having an average molecular weight of 12,500, available from BASF Wyandotte Corp.
[6]Hodag C-100-0 = RING
[7]In Example 2, a non-ionic amphipathic compound was added to a cationic polymer gel. At the 0.5% dosage level, stickiness resulted. Higher amphipathic compound dosages result in a free-flowing product.
[8]In Example 12, ananionic amphipathic compound was added to a non-ionic polymer gel. At the 2.0% dosage level, the product was rubbery. Higher amphipthic compound dosages result in a free-flowing product.
[9]in Example 14, a non-ionic amphipathic compound was added to a non-ionic polymer gel. At the 2.0% dosage level, stickiness resulted. Higher amphipathic compound dosages result in a free-flowing product.

EXAMPLES 16 THROUGH 20

Flowability After Long-Term Storage:

Examples 16 through 20 show the effect of long-term storage on polymer gels to which amphipathic comthe agitator motor was a variable speed type, ranging from 400 to 1200 rpm. While agitating the deionized water at 800 rpm, either 20 or 40 grams of the polymer gel being tested were added to the deionized water, depending on the desired concentration. The polymer gel was added over a 2- to 4-minute time interval.

After agitating the polymer solution for 15 minutes, an additional 2000 grams of deionized water were added. Samples were then withdrawn every 30 minutes, and viscosities were measured using a Brookfield Model LVT Viscometer with a No. 1 or No. 2 spindle at 6 rpm. When viscosity measurements leveled, the gel solution was poured through a 20 mesh screen to measure its gel content.

Finally, the capillary viscosity (i.e. the reduced specific viscosity) of the gel solution was measured. The final gel solutions contained 0.05 or 0.025 percent, by weight, polymer in a 1-molar sodium chloride solution. Reduced specific viscosity is a measure of product quality.

Table III below shows viscosity vs. time readings for each gel tested, the amphipathic compound used, the time period each gel was stored prior to testing, the gel solids percentages and the reduced viscosities.

TABLE III

| Example No. | Polymer & Amphipathic Compound | Time Stored (Months) | Percent Solids | Time (Hours) | Brookfield Viscosity (cps) | Reduced Viscosity $\bar{n}_{.05}$ (dl/g) |
|---|---|---|---|---|---|---|
| 21 | Polyacrylamide Gel Stabilized with Alkaquat T | 1.0 | 45 | .5 | 255 | — |
| | | | | 1.0 | 320 | — |
| | | | | 1.5 | 355 | — |
| | | | | 2.0 | 355 | 14.5 |
| | Screened H$_2$O-Swollen Gels: 11.67 g from 44 g gel in 4000 g of DI H$_2$O. = 0.3% | | | | | |
| 22 | 10% Hydrolyzed Polyacrylamide Stabilized with Alkaquat T | 1.0 | 45 | 0.5 | 3600 | — |
| | | | | 1.0 | 3675 | — |
| | | | | 1.5 | 3500 | 24.5 |
| | Screened H$_2$O-Swollen Gels: 1.7 g from 44 g gel in 4000 g DI H$_2$O. = 0.04% | | | | | |
| 23 | 36% Hydrolyzed Polyacrylamide Stabilized with Alkaquat T | 1.0 | 45 | 0.5 | 1875 | — |
| | | | | 1.0 | 2125 | — |
| | | | | 1.5 | 2225 | — |
| | | | | 2.0 | 2250 | 23.6 |
| | Screened H$_2$O-Swollen Gels: 11.2 g from 21.3 g gel in 4000 g DI H$_2$O. = 0.5% | | | | | |
| 24 | 70/30 Acrylamide/METAMS Stabilized with Gafac RS-410 | 2.0 | 50 | 0.5 | 475 | — |
| | | | | 1.0 | 960 | — |
| | | | | 1.5 | 1125 | — |
| | | | | 2.0 | 1050 | 14.0 |
| | No Gels on Screen | | | | | |

The viscosity vs. time information shown above indicates that, after storage for prolonged periods of time, the gels remained readily soluble in water. The low percentages of gels that remained undissolved indicate that no detrimental effects on the polymer gels occurred during storage (i.e. particle adhesion or crosslinking). The high reduced viscosities also indicated that the diluted products were of excellent quality.

EXAMPLES 25 THROUGH 29

Freeze-Thaw Effects On Adhesion:

Examples 25 through 29 show the results of freeze-thaw tests conducted on the polymers of Examples 16 through 20. These tests were conducted by placing 25 pounds of each polymer gel in a polyethylene bag, and placing the bag in a freezer at −10° C. overnight. After bringing the polymer gel to room temperature the following day, the cycle was repeated two more times. The gel was examined for adhesion and dilution as listed above. Results of the freeze-thaw test are shown below in Table IV.

TABLE IV

| Test | Polymer/Amphipathic Compound | Adhesion After 3 Cycles |
|---|---|---|
| Example 25 | 85/15 acrylamide/METAMS with Gafac RS-410 | free-flowing |
| Example 26 | 70/30 acrylamide/METAMS with Gafac RS-410 | free-flowing |
| Example 27 | 70/30 acrylamide/DMDAAC with Gafac RS-410 | free-flowing |
| Example 28 | 30% hydrolyzed polyacrylamide with Alkaquat T | free-flowing |
| Example 29 | polyacrylamide with Alkaquat T | free-flowing |

EXAMPLES 30 THROUGH 34

High Temperature Effects On Adhesion:

Examples 30 through 34 show the effects of elevated temperatures on the polymers of Examples 16 through 20. In these tests, 25 pounds of each polymer gel were placed in a polyethylene bag, which was placed in an oven at 50° C. for 3 days. Results of these tests are shown below in Table V.

TABLE V

| Test | Polymer/Amphipathic Compound | Adhesion After 3 Cycles |
|---|---|---|
| Example 30 | 85/15 acrylamide/METAMS with Gafac RS-410 | free-flowing |
| Example 31 | 70/30 acrylamide/METAMS with Gafac RS-410 | free-flowing |
| Example 32 | 70/30 acrylamide/DMDAAC with Gafac RS-410 | free-flowing |
| Example 33 | 30% hydrolyzed polyacrylamide with Alkaquat T | free-flowing |
| Example 34 | polyacrylamide with Alkaquat T | sticky |

What is claimd is:

1. A method for preparing free-flowing, water-soluble polymer gels comprising:
    (a) reducing the size of a water-soluble polymer gel made from monomers selected from the group consisting of dimethyldiallyl ammonium chloride, diethyldiallyl ammonium chloride, methacryloyloxyethyl trimethyl ammonium chloride, acryloyloxyethyl trimethyl ammonium chloride, methacryloyloxyethyl trimethyl ammonium methosulfate, acryloyloxyethyl trimethyl ammonium and methacrylamido propyl trimethyl ammonium chloride, alone or copolymerized with acrylamide, methacrylamide and N,N-dimethylacrylamide or mixtures thereof, by a size-reduction means, so as to produce polymer gel particles which are less than ½ inch in their longest dimension; and
    (b) adding to the size-reduced polymer gels of Step (a) 0.001 to 20 percent, by weight, of an amphipathic anionic phosphate ester, based on the total weight of said amphipathic compound and said polymer gel, thereby reducing the adhesion of said gel particles to themselves and other substances.

2. The method of claim 1, wherein said water-soluble polymer gels of Step (a) contain from 20 to 90 percent by weight polymer solids and 10 to 80 percent water.

3. The method of claim 1, wherein said polymer gels of Step (a) contain from 40 to 70 percent by weight polymer solids and 30 to 60 percent by weight water and wherein the molecular weight of said polymer gels is greater than 100,000, as determined by light scattering techniques.

4. The method of claim 1, wherein 0.5 to 20 percent, by weight, of an amphipathic compound is added.

5. The method of claim 1, wherein said polymer gel is selected from the group consisting of polymer gels made from acrylamide and methacryloyloxyethyl trimethyl ammonium methosulfate, acrylamide and dimethyldiallyl ammonium chloride, and acrylamide and methacryloyloxyethyl trimethyl ammonium chloride, and wherein said amphipathic compound is a phosphate ester of alkyl alcohol ethoxylate.

6. A free-flowing, water-soluble polymer gel admixture comprising:
    (a) a size-reduced, water-soluble polymer gel particles, made from monomers selected from the group consisting of dimethyldiallyl ammonium chloride, diethyldiallyl ammonium chloride, methacryloyloxyethyl trimethyl ammonium chloride, acryloyloxyethyl trimethyl ammonium chloride, methacryloyloxyethyl trimethyl ammonium methosulfate, acryloyloxyethyl trimethyl ammonium and methacrylamido propyl trimethyl ammonium chloride, alone or copolymerized with acrylamide, methacrylamide and N,N-dimethylacrylamide or mixtures thereof, wherein said gel particles are less than ½ inch in their longest dimension; and
    (b) an amphipathic anionic phosphate ester.

7. The admixture of claim 6, wherein said polymer gel particles of Step (a) contain from 20 to 90 percent, by weight, polymer solids and 10 to 80 percent by weight, of water.

8. The admixture of claim 6, wherein said polymer gel particles of Step (a) contain from 40 to 70 percent, by weight, polymer solids, and 30 to 60 percent, by weight water, wherein the molecular weight of said polymer gel particles is greater than 100,000, as determined by light scattering techniques, and wherein 0.5 to 20 percent, by weight, of said amphipathic compound is added, based on the total weight of (a) plus (b).

9. The admixture of claim 6, wherein said polymer gel particles are selected from the group consisting of polymers gel particles made from acrylamide and methacryloyloxyethyl trimethyl ammonium methosulfate, acrylamide and dimethyldiallyl ammonium chloride, and acrylamide and methacryloyloxyethyl trimethyl ammonium chloride, and wherein said amphipathic compound is a phosphate ester of alkyl alcohol ethoxylate.

10. A free-flowing, water-soluble polymer gel made by:
    (a) reducing the size of a water-soluble polymer gel made from monomers selected from the group consisting of dimethyldiallyl ammonium chloride, diethyldiallyl ammonium chloride, methacryloyloxyethyl trimethyl ammonium chloride, acryloyloxyethyl trimethyl ammonium chloride, methacryloyloxyethyl trimethyl ammonium methosulfate, acryloyloxyethyl trimethyl ammonium and methacrylamido propyl trimethyl ammonium chloride, alone or copolymerized with acrylamide, methacrylamide and N,N-dimethylacrylamide or mixtures thereof, by a size-reduction means, so as to produce polymer gels particles which are less than ½ inch in their longest dimension; and
    (b) adding to the size-reduced polymer gels of Step (a) 0.001 to 20 percent, by weight, of an amphipathic anionic phosphate ester, based on the total weight of said amphipathic compound and said polymer gel, thereby reducing the adhesion of said gel particles to themselves and other substances.

* * * * *